United States Patent [19]
Whitehead

[11] Patent Number: 5,959,777
[45] Date of Patent: Sep. 28, 1999

[54] PASSIVE HIGH EFFICIENCY VARIABLE REFLECTIVITY IMAGE DISPLAY DEVICE

[75] Inventor: Lorne A. Whitehead, Vancouver, Canada

[73] Assignee: The University of British Columbia, Vancouver, Canada

[21] Appl. No.: 08/872,161

[22] Filed: Jun. 10, 1997

[51] Int. Cl.[6] .............................. G02B 27/10; G02B 6/04; G02F 1/03
[52] U.S. Cl. .......................... 359/618; 359/263; 385/901
[58] Field of Search .................... 359/618, 263; 385/901; 349/62; 356/71

[56] References Cited

U.S. PATENT DOCUMENTS

| | | | |
|---|---|---|---|
| 3,571,511 | 3/1971 | Myer | 178/730 |
| 3,698,793 | 10/1972 | Tellerman | 350/160 |
| 3,730,608 | 5/1973 | Castegnier | 350/160 |
| 3,746,785 | 7/1973 | Goodrich | 350/161 |
| 3,796,480 | 3/1974 | Preston, Jr. et al. | 350/161 |
| 3,987,668 | 10/1976 | Popenoe | 73/88 |
| 4,165,155 | 8/1979 | Gordon, II et al. | 350/285 |
| 4,249,814 | 2/1981 | Hull et al. | 359/154 |
| 4,324,456 | 4/1982 | Dalisa | 350/362 |
| 4,391,490 | 7/1983 | Hartke | 350/356 |
| 5,045,847 | 9/1991 | Tarui et al. | 340/783 |
| 5,221,987 | 6/1993 | Laughlin | 359/222 |
| 5,301,009 | 4/1994 | Shurtz, II | 359/487 |
| 5,319,491 | 6/1994 | Selbrede | 359/291 |
| 5,455,709 | 10/1995 | Dula, III et al. | 359/245 |
| 5,555,327 | 9/1996 | Laughlin | 358/16 |
| 5,555,558 | 9/1996 | Laughlin | 385/16 |
| 5,561,541 | 10/1996 | Sharp et al. | 359/60 |
| 5,566,260 | 10/1996 | Laughlin | 385/16 |

FOREIGN PATENT DOCUMENTS

| | | |
|---|---|---|
| 4343808A1 | 6/1995 | Germany . |

OTHER PUBLICATIONS

"Patented fiber switch revs speed, cuts cost", George Kotelly, in "Lightwave" Oct., 1995 web site publication of PennWell Publishing Co., Tulsa, OK.

*Primary Examiner*—Georgia Epps
*Assistant Examiner*—Michael A Lucas
*Attorney, Agent, or Firm*—Oyen Wiggs Green & Mutala

[57] ABSTRACT

A variably reflective display device amenable to multiple pixel display applications. Each pixel has at least one element having a reflective state in which incident light undergoes total internal reflection, and having a non-reflective state in which total internal reflection is prevented. Such prevention is achieved by interfering with (scattering and/or absorbing) the evanescent wave adjacent the surface of the element. For example, a member can be positioned adjacent the element and deformed between first and second positions. In the first position a gap remains between the member and the element to allow the evanescent wave to behave normally. In the second position the member is in optical (but not atomic) contact with the element, such that the member interferes with the evanescent wave and thereby prevents total internal reflection. In one embodiment, each pixel is a grouping of retro-reflective elements, such as corner reflectors. An elastomeric material is provided adjacent each grouping. If a gap is left between the grouping and the elastomeric material, the grouping continues to exhibit total internal reflection. But, if the elastomeric material makes optical contact with the grouping, the evanescent wave is absorbed or scattered and hence total internal reflection is prevented, which in turn prevents reflection of incident light. Thus, the "pixel" formed by the corner reflector grouping is "off" if it makes optical contact with the elastomeric material, and "on" if a gap is left between the two.

10 Claims, 2 Drawing Sheets

FIG. IA

PASSIVE HIGH EFFICIENCY VARIABLE REFLECTIVITY IMAGE DISPLAY DEVICE

TECHNICAL FIELD

A display device in which selected, arbitrarily sized "pixels" are controllably converted from a highly reflective state arising from the phenomenon of total internal reflection to a low reflectivity state in which the total internal reflection phenomenon is disrupted.

BACKGROUND

Corner reflectors (also known as "corner cubes") are well known reflective devices. As shown in FIG. 1A, a light ray incident upon a corner reflector undergoes total internal reflection in each of three separate reflections at the three perpendicularly opposed facets which form the corner, with the net result that the light is retro-reflected from the corner reflector in a direction opposite to the direction of the incident ray.

Miniaturized transparent groupings of corner reflectors, each of which reflectors exhibit the above-described phenomenon of total internal reflection, are commonly found in reflective sheeting materials such as 3M Diamond Grade™ reflective sheeting. If the total internal reflection phenomenon could be switched on or off for a group of one or more corner reflectors, then that group could function as an image "pixel". An array of such pixels could then be assembled to construct a display device capable of displaying text or images. The present invention achieves this.

The prior art has evolved a variety of reflective image display devices. Examples include non-backlit liquid crystal display ("LCD") panels like those commonly used in calculators, and "flip" signs of the type used in some buses to display route information. However such devices are subject to various shortcomings. For example, LCD panels typically exhibit less than 50% maximum reflectivity, due to the required front polarizer. Flip signs are mechanically complex and it is difficult to miniaturize the pixels. The present invention is not subject to the same shortcomings.

SUMMARY OF INVENTION

The invention provides a multiple pixel image display device. Each pixel has at least one element having a reflective state in which incident light undergoes total internal reflection, and having a non-reflective state in which total internal reflection is prevented.

Such prevention is preferably achieved by modifying the evanescent wave associated with total internal reflection. For example, a member can be positioned adjacent the element and deformed between first and second positions. In the first position a gap remains between the member and the element to allow the evanescent wave to have the usual characteristics for total internal reflection, as is well documented in the optics literature. In the second position the member is in optical contact with the element (that is, the gap thickness is substantially less than an optical wavelength), substantially interfering with the evanescent wave, thus preventing total internal reflection.

Preferably, the member does not make atomic contact with the element when in the second position.

Otherwise, substantial difficulty may be encountered in separating the two. Accordingly, the separation distance between the member and the element should be substantially less than one wavelength (about 0.5 microns) and substantially more than the interatomic spacing of the member or the element (about $10^{-4}$ microns).

In one embodiment, each pixel is a grouping of retro-reflective elements, such as corner reflectors. An elastomeric material is provided adjacent each grouping. If a gap is left between the grouping and the elastomeric material, the grouping continues to exhibit total internal reflection. But, if the elastomeric material makes optical contact with the grouping, the evanescent wave is scattered and/or absorbed and hence total internal reflection is prevented, which in turn prevents reflection of incident light. Thus, the "pixel" formed by the corner reflector grouping is "off" if it makes optical contact with the elastomeric material, and "on" if a gap is left between the two.

The invention facilitates construction of both black-on-white and color displays. In a color display, each image pixel may for example be a three-faceted corner reflector. By deforming a coloured contact element with respect to a corresponding one of the facets, between first and second positions which respectively do not and do interfere with the evanescent wave at that facet, one may control the spectral distribution of the reflected light.

BRIEF DESCRIPTION OF DRAWINGS

FIG. 1A is a pictorial illustration of the operation of a prior art corner reflector retro-reflector.

DESCRIPTION

Figure 2A:
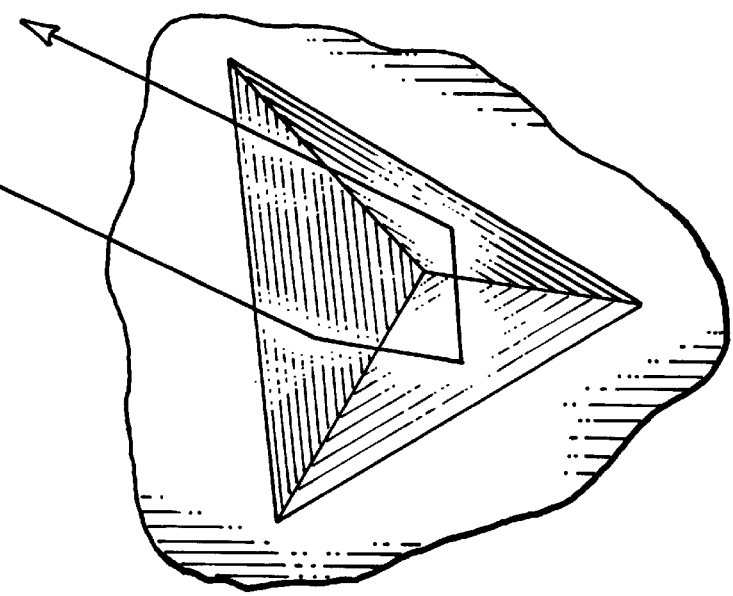
FIG. 2A is a cross-sectional illustration of a corner reflector grouping exhibiting high reflectivity due to the phenomenon of total internal reflection.
Figure 2B:
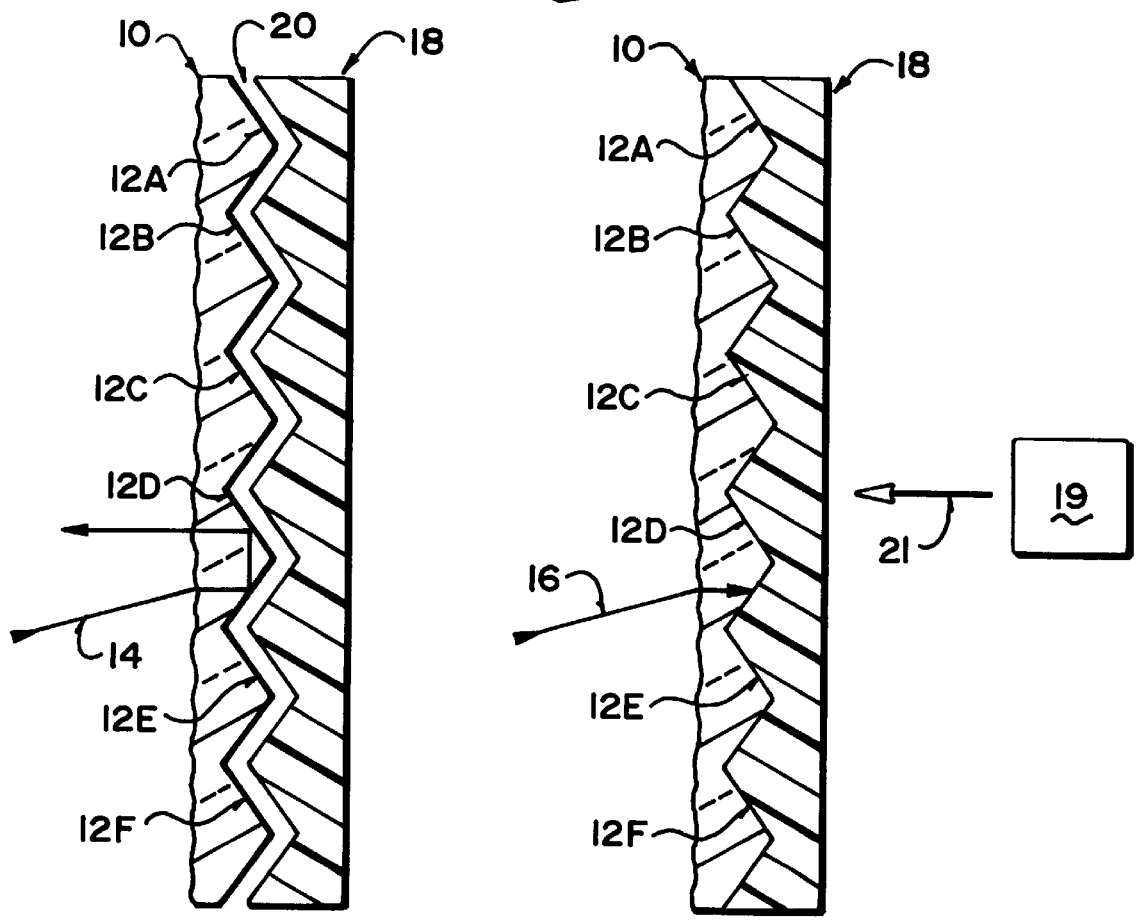
FIG. 2B is a cross-sectional illustration of a corner reflector grouping exhibiting low reflectivity due to prevention of total internal reflection.

FIGS. 2A and 2B depict, in cross-section, a grouping 10 of retro-reflective elements, namely corner reflectors. Only two facets of each corner reflector 12A, 12B, 12C, etc. are visible in such a sectional view, but persons skilled in the art will understand that each corner reflector has three perpendicularly opposed facets, as seen in FIG. 1. Corner reflector grouping 10 may be a sheet of corner cube film such as that found in 3M Diamond Grade™ reflective sheet film material. There are a variety of possible ways of switching the total internal reflection capability of corner reflector grouping 10 on or off. Before such switching techniques are discussed, it is first useful to review some background principles.

It is well known that light travels at different speeds in different materials. The change of speed results in refraction. The relative refractive index between two materials is given by the speed of an incident light ray divided by the speed of the refracted ray. If the relative refractive index is less than one, then light will be refracted towards the surface, eg light emerging from a glass block into air. At a particular angle of incidence "i", the refraction angle "r" becomes 90° as the light runs along the block's surface. The critical angle "i" can be calculated, as sin i=relative refractive index. If "i" is made even larger, then all of the light is reflected back inside the glass block and none escapes from the block. This is called total internal reflection. Because refraction only occurs when light changes speed, it is perhaps not surprising that the incident radiation emerges slightly before being totally internally reflected, and hence a slight penetration (roughly one micron) of the interface, called "evanescent wave penetration" occurs. By interfering with (i.e. scattering and/or absorbing) the evanescent wave one may prevent total internal reflection.

It is also useful to consider, by way of background, the case in which grouping 10 is either "on" or "off". For example, in FIG. 2A, grouping 10 is "on", such that incident light ray 14 is retro-reflected by corner reflector 12D due to the phenomenon of total internal reflection. Corner reflector grouping 10 thus constitutes a single "pixel" which can, as hereinafter explained, be made to appear white when "on", due to the high reflectivity exhibited by the corner reflectors. In FIG. 2B, corner reflector grouping 10 is "off", such that incident light ray 16 is not reflected by corner reflector 12D due to prevention of the phenomenon of total internal reflection as hereinafter explained. When in the "off" state, grouping 10 can easily be made to appear black, due to the low reflectivity exhibited by the corner reflectors in the off state. An array of such "pixels", each comprising a separate grouping of corner reflectors can accordingly be assembled to form a black on white display capable of displaying text or images.

If corner reflector grouping 10 is to appear white when "on" then grouping 10 should be made somewhat diffuse or a diffuse cover should be positioned over grouping 10. Although it is in practice impossible to make a "perfect" retro-reflector, currently available materials (such as the aforementioned 3M Diamond Grade™ reflective sheeting) have very substantial retro-reflective capability. Accordingly, such materials tend to reflect, to the eye of the observer, only light which has originated from near the eye of the observer, which tends not to be a very bright region. In such a case, the retro-reflector may not appear substantially white. But, if grouping 10 is diffuse, the reflected light is scattered in directions which are sufficiently different from the retro-reflective direction, as is the case with conventional white material, and this therefore achieves a white appearance, without significantly compromising the capability of the device. It should be noted that such diffusion, if too severe, may cause some light rays to travel at angles for which total internal reflection will not occur. This is undesirable, and this problem can be reduced by judicious selection of the level of diffusion and the refractive index of material which forms grouping 10.

One way of switching the total internal reflection capability of corner reflector grouping 10 on or off is to mount a sheet of elastomeric film material 18 adjacent the rear surface of corner reflector grouping 10, as seen in FIGS. 2A and 2B. In FIG. 2A, a small gap 20 is left between the adjacent faces of the sheet film materials comprising corner reflector grouping 10 and elastomeric sheet 18. With gap 20 present, elastomeric sheet 18 has no effect on corner reflector grouping 10. This is because gap 20 is much larger than one micron and therefore does not interfere with the evanescent wave and hence does not prevent the total internal reflection capability of corner reflector grouping 10. Thus, the "pixel" formed by corner reflector grouping 10 is "on" if gap 20 is present.

However, in FIG. 2B, control means 19 has been activated to move elastomeric sheet 18 in the direction of arrow 21 such that the adjacent faces of corner reflector grouping 10 and elastomeric sheet 18 are in "optical contact" with one another. Optical contact between elastomeric sheet 18 and corner reflector grouping 10 brings elastomeric sheet 18 substantially closer than one micron to corner reflector grouping 10, thereby scattering and/or absorbing the evanescent wave adjacent corner reflector grouping 10, thus preventing the capability of corner reflector grouping 10 to totally internally reflect incident light ray 16. The "pixel" formed by corner reflector grouping 10 is accordingly "off" if the adjacent faces of corner reflector grouping 10 and elastomeric sheet 18 are in optical contact with one another, with no gap between them.

Control means 19 may be any one of a large possible range of means capable of displacing elastomeric sheet 18 through the small displacements required to either form gap 20 or to achieve optical contact between elastomeric sheet 18 and corner reflector grouping 10. For example, control means 19 may be a hydraulic or pneumatic actuator; or, an electronic, electrostatic, magnetic, agnetostrictive or piezo-electric transducer, etc.

The elastomeric characteristic of sheet 18 is important. If a stiff, non-elastomeric material were substituted for sheet 18 then the surfaces of both corner reflector grouping 10 and sheet 18 would have to be made flat to within about one tenth of one wavelength to enable the surfaces to be brought into optical contact with one another so as to interfere with the evanescent wave and thereby prevent total internal reflection. Attainment of such flatness is impractically expensive. Even if surfaces exhibiting such flatness were readily and inexpensively available, the presence of minute foreign particles between corner reflector grouping 10 and sheet 18 could prevent attainment of optical contact between the surfaces over a large area which would therefore remain totally internally reflective. Due to its elastomeric characteristic, sheet 18 is able to attain optical contact with substantially the entire adjacent portion of corner reflector grouping 10, with minute foreign particles preventing attainment of optical contact in only relatively insignificantly small areas.

Preferably, elastomeric sheet 18 has a thin, comparatively hard (that is, hard in comparison to the soft elastomeric material) outer surface coating which prevents substantial atomic contact between sheet 18 and corner reflector grouping 10, but does not prevent optical contact between the two surfaces as aforesaid. If such atomic contact occurs, substantial force and time may be required to separate the two surfaces when it is desired to switch the pixel from "off" to "on". In order to achieve the required deformation of elastomeric sheet 18 necessary to attain optical contact with corner reflector grouping 10 (especially if the face of elastomeric sheet 18 is not contoured to match the adjacent corner reflector contoured face of corner reflector grouping 10) it is advantageous to form elastomeric sheet 18 of a low modulus elastomeric substance, such as are typically called "silicone gels".

It will thus be understood that the separation distance between the two surfaces must be substantially less than one wavelength (about 0.5 microns) in order to attain optical contact between the surfaces; and, substantially greater than the materials' typical interatomic spacings (about $10^{-4}$ microns) in order to prevent atomic contact between the surfaces.

It will also be understood that if microminiaturization techniques are employed one may avoid the need for elastomeric sheet 18 and substitute some nonelastomeric material. Specifically, if the individual corner reflectors contained within corner reflector grouping 10 are sufficiently small, then the material's large scale surface flatness becomes less important.

For each "pixel", an electronically controlled pneumatic actuator (not shown) may be provided to deform elastomeric sheet 18 between a first position in which gap 20 remains between corner reflector grouping 10 and elastomeric sheet 18, and a second position in which elastomeric sheet 18 is in optical contact with corner reflector grouping 10.

As depicted in FIGS. 2A and 2B the face of elastomeric sheet 18 is contoured to match the adjacent corner reflector contoured face of the sheet material comprising corner reflector grouping 10. However, such contour matching is not essential. If corner reflectors 12A, 12B, 12C, etc. are sufficiently small, then elastomeric sheet 18 could simply be deformed under applied electrostatic pressure to force elastomeric sheet 18 into the desired optical contact with corner reflector grouping 10 whenever corner reflector grouping 10 was to be switched "off".

By making the applied electrostatic pressure slightly less than that required to achieve optical contact between elastomeric sheet 18 and corner reflector grouping 10, one could adapt the device to function as a "white board". Specifically, optical contact between elastomeric sheet 18 and corner reflector grouping 10 would occur only at those regions where additional pressure was applied by bringing a "writing implement" such as a stylus into contact with a desired point on the outward face of corner reflector grouping 10, thereby turning the contacted pixel(s) off and converting their appearance from white to black. The "white board" could be erased by removing the voltage signal used to apply the initial electrostatic pressure. The location of the pixel(s) contacted by the stylus could easily be sensed, thus additionally allowing the device to function as a digitizer for converting an image to electronic form.

As explained above, a light ray incident upon a corner reflector undergoes total internal reflection by making three separate reflections at the three perpendicularly opposed facets which form the corner reflector. Accordingly, for each corner reflector within grouping 10, there are three separate opportunities for preventing total internal reflection. By independently controlling light reflection at each of the three opposed facets of each corner reflector, one may construct a full color display.

Figure 3A:
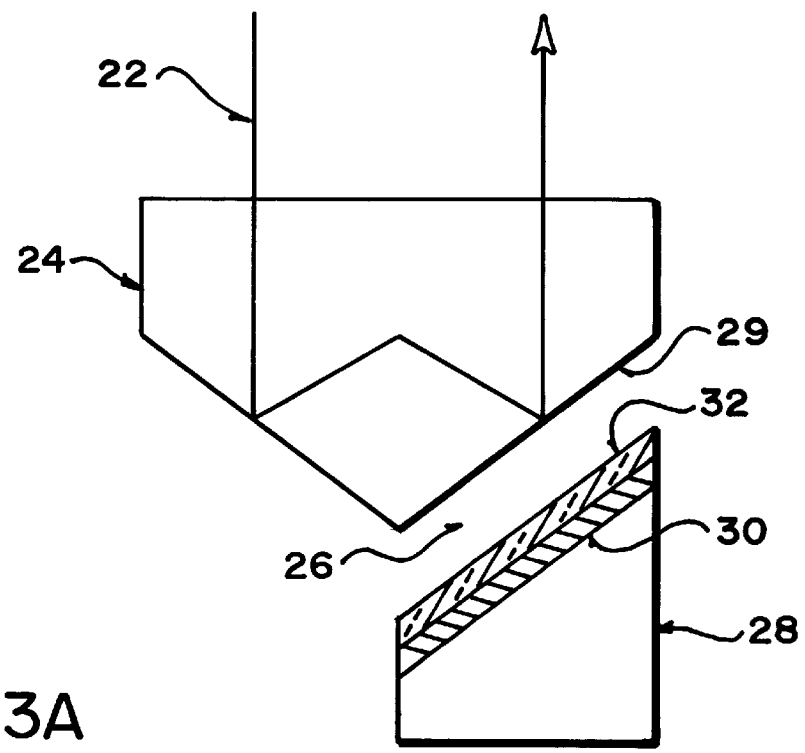
FIG. 3A is a cross-sectional illustration of a corner reflector showing a contact element consisting of color dye layer atop a silver substrate spaced from one facet of the corner reflector.

For example, instead of employing a single elastomeric sheet 18, one may alternatively provide a different contact element for each one of the three opposed facets of each corner reflector, with the contact elements respectively consisting of yellow, magenta, and cyan dyes layer atop a silver substrate. FIG. 3A depicts, in cross-section, a single corner reflector 24 with a contact element 28 spaced from one facet 29 of corner reflector 24 by a gap 26. The face of contact element 28 adjacent facet 29 consists of a color dye layer 32 atop a reflective silver substrate 30. For ease of illustration, only one contact element is shown, but in practice a separate contact element is associated with each of the three facets of corner reflector 24.

Figure 3B:
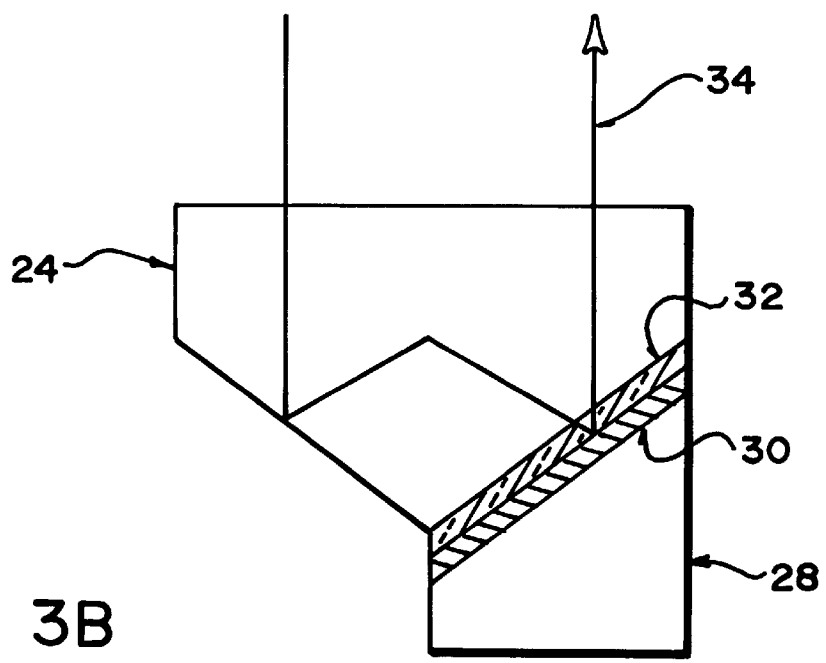
FIG. 3B is similar to FIG. 3A, but shows the contact element in optical contact with the adjacent facet of the corner reflector to control the spectral distribution of the reflected light.

With gap 26 present, corner reflector 24 exhibits total internal reflection, resulting in retro-reflection of incident ray 22 as described above. However, if gap 26 is eliminated by placing contact element 28 in optical contact with facet 29 as shown in FIG. 3B, then contact element 28 interferes with the evanescent wave as explained above. In such case, dye layer 32 selectively absorbs certain wavelengths, with the degree of absorption depending upon the degree of optical contact between contact element 28 and facet 29 (achievable by controllably positioning contact element 28 adjacent facet 29 in any one of a selected range of optical contact sub-positions). As light passes through dye layer 32 to reflective silver substrate 30, the light undergoes primary color subtraction (i.e. the yellow dye layer absorbs blue light, etc.). Accordingly, one may control the spectral distribution of the reflected ray 34 by controllably sub-positioning the respective contact elements as aforesaid to achieve full color display.

Moreover, the color display described above can achieve a high reflectivity, in contrast to the very low maximum reflectivity of prior art color displays. This is because, when any particular corner reflector facet is "on" (i.e. no contact element is in optical contact with the corner reflector facet) that facet remains fully reflective and can easily be made to appear white in the same manner described above for a black on white display. (By contrast, prior art color displays which have separately coloured red, green and blue pixels have substantially reduced reflectivity when the pixel is not activated so as to give the pixel a non-coloured net appearance.) In accordance with the present invention, if all three of a given corner reflector's facets are "on", that corner reflector appears white. If one or two, but not all three of a given corner reflector's facets are "on" then that corner reflector has a coloured appearance, with the color depending upon the degree of optical contact between the contact elements and their corresponding "off" corner reflector facets.

Alternatively, one may construct a color display in the more common fashion of segmenting each pixel into red, blue and green segments. By selectively optically contacting suitable members with each of the respective segments, one may interfere with the evanescent wave at the respective segments to a degree sufficient to alter the spectral distribution of the light reflected through the respective segments and thereby give the overall pixel any desired color. However, this "segmented" method cannot yield a bright white appearance in the uncoloured state.

Another, less sophisticated color technique involves applying a color "A" to the material of sheet 10, and applying a different color "B" to the material of elastomeric backing 18. In this case, the "on" state is represented by color "A", and the "off" state is represented by color "B" combined subtractively with color "A". Useful examples of "A"-"B" color combinations include yellow-black, yellow-red, yellow-green, magenta-black, magenta-red, magenta-blue, cyan-black, cyan-green, cyan-blue, white-yellow, white-cyan, white-magenta, white-red, white-green, white-blue and white-black. For example, the white-green combination is of interest in relation to highway signs, which typically feature white lettering on a green background (the "on" state may represent either a background or a foreground color).

It is noteworthy that the overall grouping 10 need not be miniature. For example, if a highway sign or sports stadium type large format display is required, then the single "pixel" formed by corner reflector grouping 10 could be several inches square, or even larger. Besides simplifying construction of the above-described contact elements, this also simplifies the circuitry required to control a complete sign consisting of a large array of such pixels. For example, in some large format prior art displays, each pixel must be formed of a relatively large number of light sources, with each such source requiring separate power and control circuitry. By contrast, the present invention incorporates display pixels which require no such pixel-size-dependent multiplication of power or control circuitry. The invention accordingly facilitates construction of large, low pixel cost per unit area, efficient, bright displays. Besides the aforementioned highway sign or sports stadium applications, the invention is also easily adapted to the construction of advertising displays, variable message signs, clocks, and the like.

As will be apparent to those skilled in the art in the light of the foregoing disclosure, many alterations and modifications are possible in the practice of this invention without departing from the spirit or scope thereof. For example, a variety of structure exhibiting the phenomenon of total internal reflection could be used in place of corner reflectors, as long as sufficient reflection occurs. As another example, in some applications of the invention, such as highway signs, the above-described retro-reflective property is important (i.e. to achieve directed reflection of light emitted by vehicle headlamps to illuminate the sign for viewing by persons in such vehicles), but in most other applications only the reflection effect is wanted in which case the outward face or optical material of the sheet comprising corner reflector grouping 10 should be somewhat diffuse. Accordingly, the scope of the invention is to be construed in accordance with the substance defined by the following claims.

What is claimed is:

1. A multiple pixel image display device, comprising:
   (a) each said pixel formed by at least one element having a reflective state in which light incident upon a front surface of said element undergoes total internal reflection and an absorptive state in which said total internal reflection is prevented, said total internal reflection being characterized by an evanescent wave adjacent a rearward surface of said element; and,
   (b) switching means for controllably switching said elements between said states, said switching means further comprising a member positioned adjacent said rearward surface and deformable between a first position in which a gap remains between said member and said rearward surface and a second position in which said member is in optical contact with said rearward surface to provide a separation distance between said member and said rearward surface of substantially less than 0.5 microns and substantially more than $10^{-4}$ microns, said member not interfering with said evanescent wave in said first position, said member interfering with said evanescent wave in said second position and thereby preventing said total internal reflection, said second position not permitting substantial atomic contact between said member and said rearward surface.

2. An image display method, comprising:
   (a) forming a plurality of image pixels, each of said pixels having a reflective state in which light incident upon a front surface of said pixel undergoes total internal reflection, said total internal reflection being characterized by an evanescent wave adjacent a rearward surface of said element; and,
   (b) preventing said total internal reflection at selected ones of said pixels to switch said selected pixels from said reflective state to an absorptive state, said preventing comprising positioning a member adjacent a rearward surface of said selected pixels and deforming said member between a first position in which a gap remains between said member and said rearward surface and a second position in which said member is in optical contact with said rearward surface with a separation distance between said member and said rearward surface of substantially less than 0.5 microns and substantially more than $10^{-4}$ microns, said second position not permitting substantial atomic contact between said member and said rearward surface, said member not interfering with said evanescent wave in said first position, said member interfering with said evanescent wave in said second position and thereby preventing said total internal reflection.

3. An image display method as defined in claim 2, wherein said member is an elastomeric material.

4. An image display method as defined in claim 2, wherein said image pixels each comprise a three-faceted corner reflector, said preventing further comprising, for each one of said pixels, deforming a coloured contact element with respect to a corresponding one of said facets between first and second positions which respectively do not and do interfere with said evanescent wave at said corresponding facet.

5. An image display device as defined in claim 1, wherein each of said elements is retro-reflective, and wherein each of said pixels further comprises a grouping of said elements.

6. An image display device as defined in claim 5, wherein said retro-reflective elements are corner reflectors.

7. An image display device as defined in claim 5, wherein said retro-reflective element grouping is diffuse.

8. An image display device as defined in claim 1, wherein said member further comprises an elastomeric material.

9. An image display device as defined in claim 8, wherein said elastomeric material has a thin, comparatively hard outer surface coating.

10. An image display device as defined in claim 1, each of said pixels comprising at least one three-faceted corner reflector, said image display device further comprising a coloured reflective contact element for each one of said three corner reflector facets, each one of said contact elements deformable between a first position in which a gap remains between said one contact element and said corresponding corner reflector facet, and a second position in which said one contact element is in optical contact with said corresponding corner reflector facet.

* * * * *